(12) United States Patent
Ohno et al.

(10) Patent No.: US 8,103,560 B2
(45) Date of Patent: Jan. 24, 2012

(54) INVENTORY MANAGEMENT SYSTEM, INVENTORY MANAGEMENT METHOD AND COMPUTER-READABLE RECORDING MEDIUM

(75) Inventors: Yoshio Ohno, Kanagawa (JP); Makiko Watanabe, Kanagawa (JP); Yasuyuki Kimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 93 days.

(21) Appl. No.: 12/330,724

(22) Filed: Dec. 9, 2008

(65) Prior Publication Data

US 2009/0157533 A1 Jun. 18, 2009

(30) Foreign Application Priority Data

Dec. 12, 2007 (JP) ................. 2007-321160

(51) Int. Cl.
*G06Q 10/00* (2006.01)
(52) U.S. Cl. ........... 705/28; 705/1; 705/2; 705/7; 705/8; 705/9; 705/10; 705/14; 705/22; 705/26; 705/29; 705/35; 700/97; 700/99; 700/102; 700/106; 700/115
(58) Field of Classification Search .............. 705/28
See application file for complete search history.

(56) References Cited

U.S. PATENT DOCUMENTS

| | | | |
|---|---|---|---|
| 2002/0072986 A1* | 6/2002 | Aram | 705/26 |
| 2003/0110104 A1* | 6/2003 | King et al. | 705/28 |
| 2003/0172007 A1* | 9/2003 | Helmolt et al. | 705/28 |
| 2004/0044595 A1* | 3/2004 | Castro | 705/28 |

FOREIGN PATENT DOCUMENTS

| | | |
|---|---|---|
| JP | 2004-75321 | 3/2004 |
| JP | 2007-141036 | 6/2007 |

OTHER PUBLICATIONS

Er, Mahendrawathi & MacCarthy, Bart. Managing product variety in multinational corporation supply chains a simulation study. Journal of Manufacturing Technology Management, v17n8, p. 1117-1138, 2006 (includes Tables Diagrams Graphs).*

* cited by examiner

*Primary Examiner* — F. Zeender
*Assistant Examiner* — Fawaad Haider
(74) *Attorney, Agent, or Firm* — Oblon, Spivak, McClelland, Maier & Neustadt, L.L.P.

(57) ABSTRACT

A market-demand-forecasting-value calculation section acquires order entry actual achievement data from an order-entry-actual-achievement-data storing unit of an order receiving system, and calculates a market demand forecasting value using the order entry actual achievement data. A correction safety inventory quantity calculation section calculates an error rate, which becomes negative when an ordering required-quantity becomes large, based on a number of ordered parts and a past ordering required-quantity. Subsequently, the correction safety inventory quantity calculation section calculates a correction safety inventory quantity using the error rate and the market demand forecasting value and a money-amount-zone index value. Further, the correction safety inventory quantity calculation section calculates a determined safety inventory quantity which is a value obtained by adding the correction safety inventory quantity and a reference safety inventory quantity calculated based on the market demand forecasting value.

9 Claims, 3 Drawing Sheets

INVENTORY MANAGEMENT SYSTEM, INVENTORY MANAGEMENT METHOD AND COMPUTER-READABLE RECORDING MEDIUM

BACKGROUND OF THE INVENTION

1. Field of the Invention

The present invention relates to an inventory management system, etc., which calculates a safety inventory quantity of a product, and performs inventory management based on the calculated safety inventory quantity.

2. Description of the Related Art

Recently, maintaining a suitable inventory quantity becomes important in the sales of products. For example, if the inventory quantity is too large, management costs increase, and conversely, if the inventory quantity is too little, there is a possibility to miss sales opportunity.

In order to maintain a suitable inventory quantity, the market demands of products are sometimes forecasted. This is because it becomes easy to maintain an appropriate inventory quantity if the market demand forecast is accurate. Accordingly, Unexamined Japanese Patent Application KOKAI Publication No. 2007-141036 or the like discloses a technology for forecasting a market demand accurately. According to such a technology, a management computer calculates a tendency function (tendency curve) based on the transition of an actual achievement of an order entry, calculates a rate between the tendency curve and an actual achievement of an order entry, and calculates a time change in the rate. Subsequently, the management computer calculates a periodical function with respect to a time change in a logarithm of the rate by fitting. Next, the management computer converts the periodical function, calculated by fitting, from the logarithm scaling to a normal scaling. Further, the management computer synthesizes a periodical fluctuation model (periodical function) in the acquired normal scaling with a tendency curve (tendency function) to calculate a market demand forecasting curve, thereby forecasting a market demand using the market demand forecasting curve. The use of the management computer enables effective and exact market demand forecasting in consideration of a periodical fluctuation of an error in a market demand forecasting for a predetermined product.

However, even if such market demand forecasting is performed, it is preferable that an inventory quantity should have some margins in order to cope with an unexpected market demand fluctuation. In order to do so, for example, as disclosed in Unexamined Japanese Patent Application KOKAI Publication No. 2004-75321, it is typical to set a safety inventory quantity. According to a technology disclosed in this publication, a management computer calculates a normal inventory reference value based on a certain period deflection width inventory (a product of the total of quantities of products to be sold in a certain period in which a stock quantity is settled and a deflection width rate) and a safety inventory quantity. Note that a deflection width rate is a rate of a deflection width of an actual achievement quantity from a past expected quantity. Next, the management computer calculates an inventory reference value based on the normal inventory reference value and a lumping inventory reference value. Further, the management computer calculates an inventory expected quantity based on a quantity of a product to be sold and an inventory actual achievement expected quantity. Finally, the management computer calculates a replenishment quantity of a product based on the difference between the inventory actual achievement expected quantity and an inventory reference quantity.

However, like the foregoing management computer, if a safety inventory quantity is fixed, there is a possibility that the safety inventory becomes an excessive inventory when a market demand is smaller than a forecast. On the other hand, a safety inventory is for preparing an unexpected fluctuation in a market demand, so that the significance of a safety inventory may be lost if the safety inventory is merely reduced quantitatively.

The present invention has been made in view of the foregoing problems, and it is an object of the present invention to provide an inventory management system which calculates a more appropriate safety inventory quantity, and performs inventory management using the safety inventory quantity, an inventory management method and a computer-readable recording medium.

SUMMARY OF THE INVENTION

To achieve the object, an inventory management system according to the first aspect of the present invention comprises: a correction quantity calculation unit that calculates a correction quantity for a safety inventory quantity of a product based on an error rate, wherein the error rate indicates an error of an actual order quantity of the product to a past ordering required-quantity thereof, becomes positive when the ordering required-quantity is larger than the order quantity, and becomes negative when the order quantity is smaller than the ordering required-quantity; and a safety inventory quantity calculation unit that calculates a safety inventory quantity which is a value obtained by adding the correction quantity to a reference safety inventory quantity based on market demand forecasting of the product.

According to the present invention, when the order quantity is smaller than the ordering required-quantity, the error rate becomes negative, and the correction quantity also becomes negative. Conversely, when the order quantity is larger than the ordering required-quantity, the error rate becomes positive, and the correction quantity also becomes positive.

The safety inventory quantity is acquired by adding the reference safety inventory quantity based on the market demand forecasting of a product and the calculated correction quantity. Therefore, when the correction quantity is positive, the final safety inventory quantity becomes larger than the reference safety inventory quantity, and when the correction quantity is negative, the final safety inventory quantity becomes smaller than the reference safety inventory quantity.

Accordingly, when the actual order entry achievement is larger than the market demand forecasting value and there is no margin in stocked products, the safety inventory quantity is increased, so that it is possible to suppress any occurrence of stock-out due to an unexpected market demand fluctuation. On the other hand, when the actual order entry achievement is smaller than the market demand forecasting value and there is excessive stocked products, the safety inventory quantity is reduced, so that it is possible to suppress any excessive inventory.

That is, according to the present invention, it is possible to increase/reduce the safety inventory quantity in accordance with a market demand forecasting value and an order entry actual achievement, thereby maintaining an appropriate inventory quantity.

The correction quantity calculation unit may calculate the error rate for each office which supplies the product based on an error in an actual order quantity of the product to a past ordering required-quantity thereof in a predetermined period. This makes it possible to calculate an error rate according to the recent situation for each office, and calculate more accurate error rate when there is a periodical fluctuation or the like in a market demand forecasting curve.

The correction quantity calculation unit may calculate the correction quantity based on the error rate and a market demand forecasting value in a supply lead time of the product. This makes it possible to adjust the correction quantity based on a supply lead time, so that appropriate inventory management in consideration of the supply time of a product becomes possible.

The correction quantity calculation unit may calculate the correction quantity based on the unit price of the product. Accordingly, the correction quantity in accordance with the unit price of the product is acquired, inventory management based on costs becomes possible.

The inventory management system may further comprise: a reference safety inventory quantity calculation unit that calculates the reference safety inventory quantity based on a market demand forecasting value of the product and an index number set for each supply lead time of the product. Accordingly, the reference safety inventory quantity can be quickly increased/decreased in accordance with an index number set per supply lead time of a product, it is possible to quickly cope with the fluctuation in an order quantity due to unexpected reasons.

The inventory management system may further comprise: a market-demand-forecasting-value calculation unit that calculates the market demand forecasting value based on an order entry actual achievement, product by product and office by office which supplies the product. Accordingly, it is possible to calculate an appropriate safety inventory quantity for each office and for each product.

An inventory management method according to the second aspect of the present invention comprises: an error rate calculation step of calculating an error rate, wherein the error rate indicates an error in an actual order quantity of a product to a past ordering required-quantity thereof, becomes positive when the ordering required-quantity is larger than the order quantity and becomes negative when the order quantity is smaller than the ordering required-quantity; a correction quantity calculation step of calculating a correction quantity for a safety inventory quantity of the product based on the error rate; and a safety inventory quantity calculation step of calculating a safety inventory quantity by correcting a reference safety inventory quantity according to a market demand forecasting value of the product with the correction quantity.

A computer-readable recording medium according to the third aspect of the present invention stores a program that allows a computer to execute: an error rate calculation step of calculating an error rate, wherein the error rate indicates an error in an actual order quantity of a product to a past ordering required-quantity thereof, becomes positive when the ordering required-quantity is larger than the order quantity and becomes negative when the order quantity is smaller than the ordering required-quantity; a correction quantity calculation step of calculating a correction quantity for a safety inventory quantity of the product based on the error rate; and a safety inventory quantity calculation step of calculating a safety inventory quantity by correcting a reference safety inventory quantity according to a market demand forecasting value of the product with the correction quantity.

As explained above, according to the present invention, it becomes possible to do appropriate inventory management based on a more appropriate safety inventory quantity.

BRIEF DESCRIPTION OF THE DRAWINGS

These object and other objects and advantages of the present invention will become more apparent upon reading of the following detailed description and the accompanying drawings in which.

DETAILED DESCRIPTION OF THE PREFERRED

Embodiment

An explanation will be given of an embodiment of an inventory management system which embodies the present invention with reference to FIGS. 1 to 3. The inventory management system of the embodiment calculates a safety inventory quantity based on comparison between a market demand forecasting of a service part as a product and an actual achievement of order entry, and performs inventory management based on the safety inventory quantity. In the embodiment, explanations will be also given of an inventory management method and an inventory management program executed by the inventory management system.

A service part means a part which is replaced in a service coping with consumption of a part of a manufactured article, failure of the manufactured article, and the like. This part is a minimum unit to maintain the function of the manufactured article. A service part includes not only a single part but also a combination of plural parts.

Figure 1:
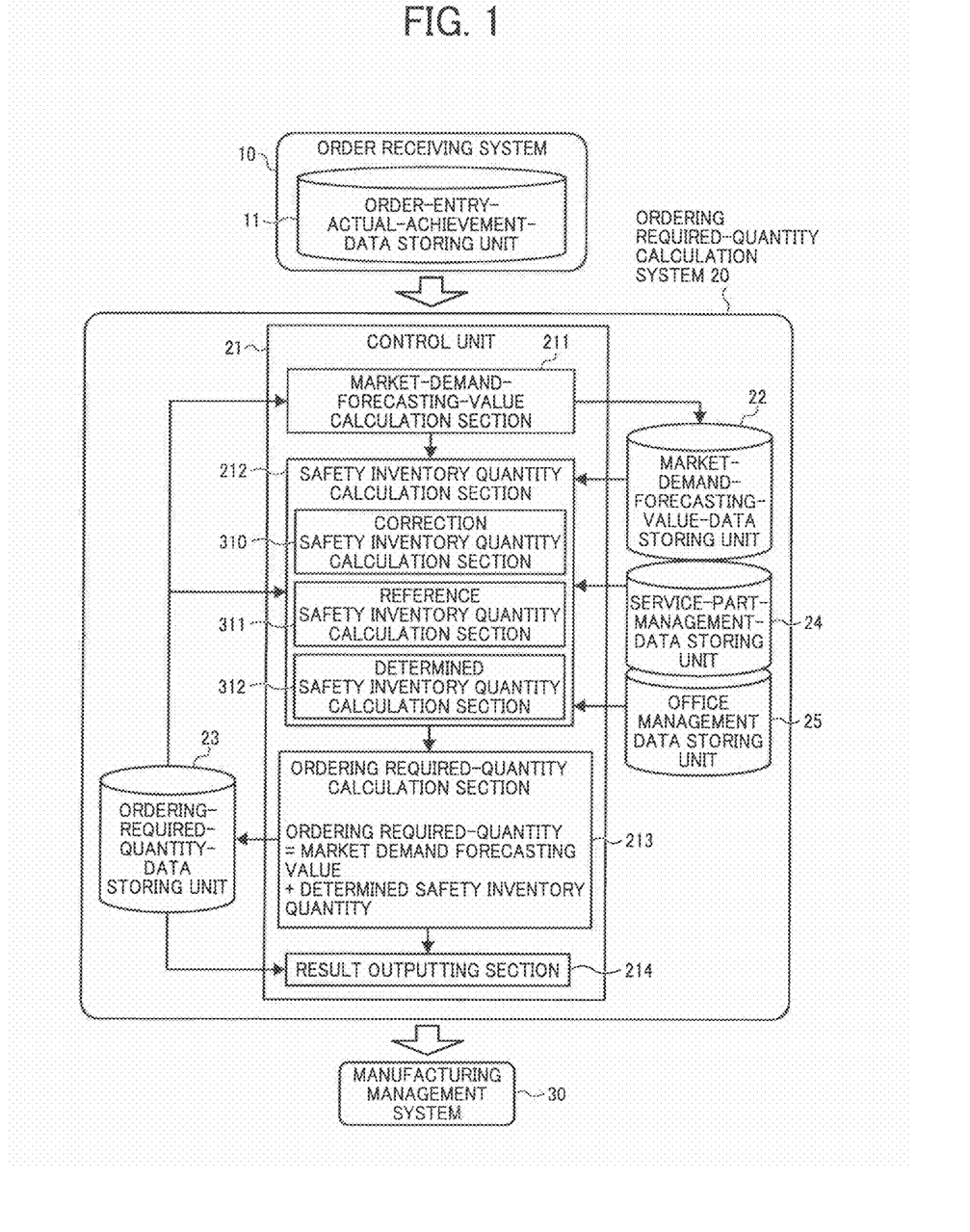
FIG. 1 is a schematic diagram showing an inventory management system according to an embodiment of the present invention.

According to the embodiment, as shown in FIG. 1, the inventory management system comprises an order receiving system 10, an ordering required-quantity calculation system 20, and a manufacturing management system 30.

The order receiving system 10 manages actual order entries. The ordering required-quantity calculation system 20 calculates an ordering required-quantity of the service parts to be manufactured based on a past order quantity. The manufacturing management system 30 manages manufacturing of the service parts based on the calculated ordering required-quantity. Note that an ordering required-quantity is a sum of a market demand forecasting value and a safety inventory quantity.

The order receiving system 10 will now be explained in detail. The order receiving system 10 has non-illustrated CPU, RAM, ROM communication means like a communication interface, and the like. The order receiving system 10 is connected to a network through the communication interface. As the order receiving system 10 receives order information through the network, an actual order is settled.

The order receiving system 10 is further connected to non-illustrated computer terminals. A computer terminal is provided at a sales office, a service office, or the like. The computer terminal has non-illustrated CPU, RAM, ROM, input means, such as a keyboard, and a mouse, output means like a display, and communication means like a communication interface.

The order receiving system 10 has an order-entry-actual-achievement-data storing unit 11. The order-entry-actual-achievement-data storing unit 11 stores an actual achievement of an order entry of the service part actually ordered. As a computer terminal transmits information on an actual order entry, order-entry-actual-achievement data 110 in accordance with that information is stored in the order-entry-actual-achievement-data storing unit 11. The order-entry-actual-achievement data 110 is data on an actual achievement of an order entry service part by service part, month by month, and office by office.

Figure 2A:
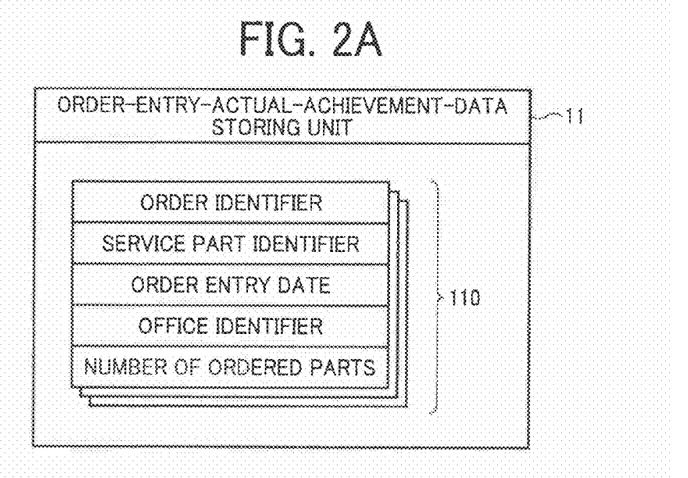
FIG. 2A is an explanatory diagram showing data stored in an order-entry-actual-achievement-data storing unit.
Figure 3:
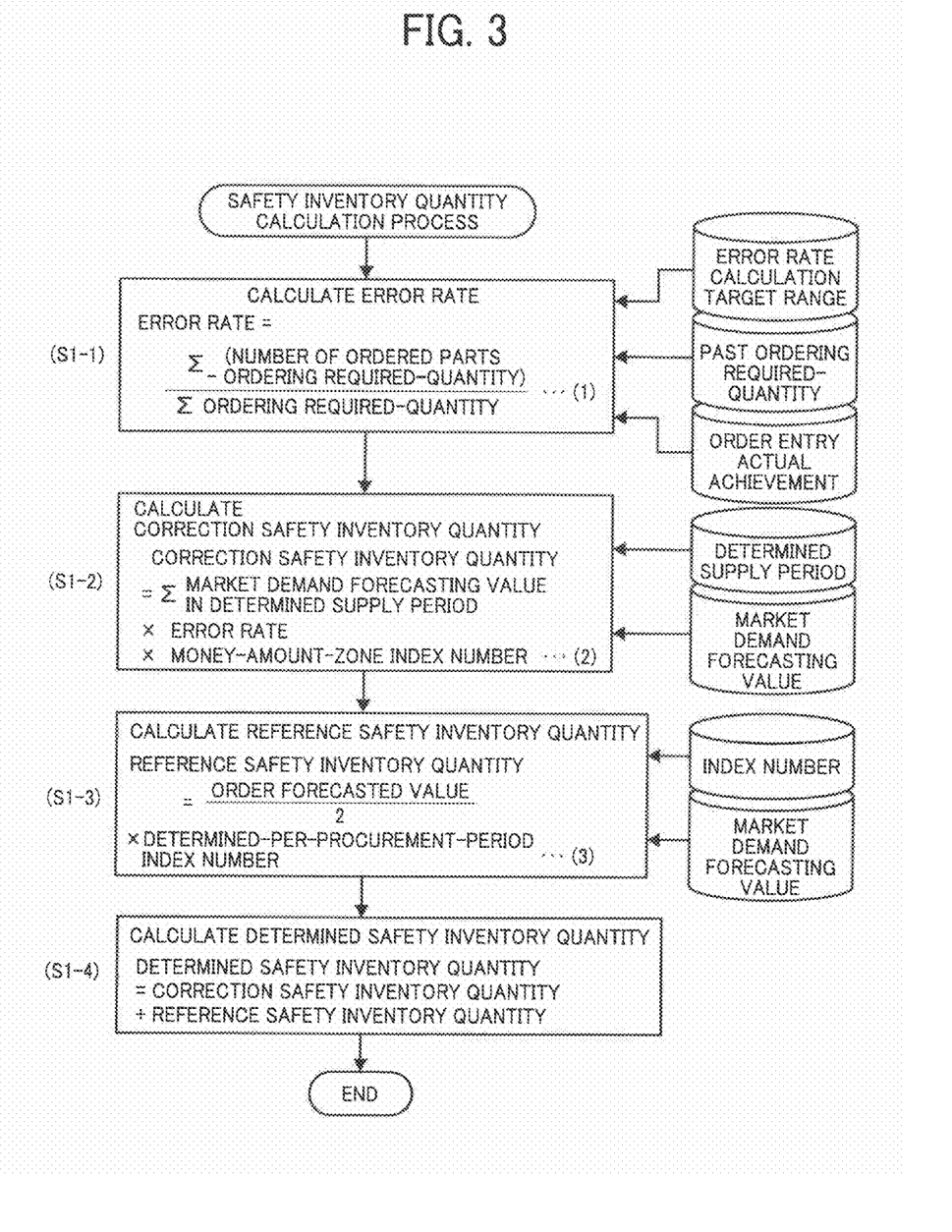
FIG. 3 is a flowchart for explaining the procedure of a safety inventory quantity calculation process according to the embodiment of the present invention.

As shown in FIG. 2A, the order-entry-actual-achievement data 110 includes plural pieces of data on a order identifier, a service part identifier, order entry date, an office identifier and a number of ordered parts. Each piece of data is stored in a corresponding data area.

An order identifier data area stores data on an identifier to specify an order.

A service part identifier data area stores data on an identifier to specify an ordered service part. The service part identifier is, e.g., a part number.

An order entry date data area stores data on the date when the order is settled.

An office identifier data area stores data on the office identifier to specify an office to which the ordered service part must be sent.

A number of ordered parts data area stores data on a number of ordered service parts (order quantity).

Next, the ordering required-quantity calculation system 20 will now be explained in detail.

The ordering required-quantity calculation system 20 is a computer system which processes various data to calculate an ordering required-quantity. The ordering required-quantity calculation system 20 calculates an ordering required-quantity based on the order-entry-actual-achievement data 110 stored in the order-entry-actual-achievement-data storing unit 11. Next, the ordering required-quantity calculation system 20 supplies the calculated ordering required-quantity to the manufacturing management system 30.

The ordering required-quantity calculation system 20 comprises a control unit 21, a market-demand-forecasting-value-data storing unit 22, an ordering-required-quantity-data storing unit 23, a service-part-management-data storing unit 24, and an office management data storing unit 25.

The control unit 21 comprises non-illustrated CPU, RAM, ROM, and the like. As the CPU executes a process program, the control unit 21 transmits/receives data with the order receiving system 10, and executes a management process of various data to forecast a market demand. Further, as the CPU executes this process program, a process to be discussed later (process including a market-demand-forecasting-value calculation step, a safety inventory calculation step, an ordering required-quantity calculation step, and a result outputting step) is realized, and the control unit 21 function as a market-demand-forecasting-value calculation section 211, a safety inventory quantity calculation section 212, an ordering required-quantity calculation section 213, and a result outputting section 214.

First, the market-demand-forecasting-value calculation section 211 will be explained.

The market-demand-forecasting-value calculation section 211 calculates a market demand forecasting value based on an order entry quantity stored in order-entry-actual-achievement-data storing unit 11. In the embodiment, the market-demand-forecasting-value calculation section 211 calculates a monthly market demand forecasting value for each office using a technology disclosed in, for example, Unexamined Japanese Patent Application KOKAI Publication No. 2007-141036.

Further, the market-demand-forecasting-value calculation section 211 has an operating day calendar which associates an operating day with a distribution quantity of a market demand forecasting value. Using the operating day calendar, the market-demand-forecasting-value calculation section 211 divides a calculated market demand forecasting value on a pro-rate basis, calculates a daily market demand forecasting value, and stores the calculated daily market demand forecasting value into the market-demand-forecasting-value-data storing unit 22.

Figure 2B:
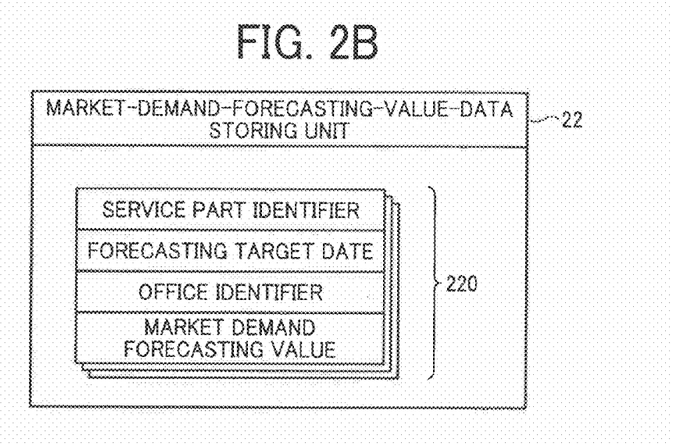
FIG. 2B is an explanatory diagram showing data stored in a market-demand-forecasting-value-data storing unit.

As shown in FIG. 2B, the market-demand-forecasting-value-data storing unit 22 stores daily market demand forecasting value data 220 service part by service part, month by month, and office by office.

Every time the market-demand-forecasting-value calculation section 211 calculates a market demand forecasting value, market demand forecasting value data 220 including that market demand forecasting value is stored.

As shown in FIG. 2B, the market demand forecasting value data 220 includes pieces of data on a service part identifier, a forecasting target date, an office identifier and a market demand forecasting value, and each piece of data is stored in a corresponding data area.

A service part identifier data area stores data on an identifier to specify a forecasting-target service part.

A forecasting target date data area stores data on a date subjected to market demand forecasting of a service part.

An office identifier data area stores data on the office identifier to specify an office where a service part is consumed.

A market demand forecasting value data area stores data on a number of service parts that a market demand is forecasted (market demand forecasting value).

Next, the safety inventory quantity calculation section 212 will now be explained.

As shown in FIG. 1, the safety inventory quantity calculation section 212 comprises a correction safety inventory quantity calculation section 310, a reference safety inventory quantity calculation section 311, and a determined safety inventory quantity calculation section 312.

First, an explanation will be given of the correction safety inventory quantity calculation section 310.

The correction safety inventory quantity calculation section 310 calculates a correction safety inventory quantity. Note that a correction safety inventory quantity means a safety inventory quantity for correcting a safety inventory quantity.

A correction safety inventory quantity is calculated based on the sum of market demand forecasting values in a determined supply period, an error rate of a market demand forecasting value, and a money-amount-zone index number. Note that a determined supply period means a period from when a service part is ordered to when the service part is delivered. The correction safety inventory quantity calculation section 310 calculates an error rate using an error rate calculation equation. The error rate calculation equation is shown in FIG. 3 as equation (1).

The correction safety inventory quantity calculation section 310 acquires a number of ordered parts as an order quantity from the order-entry-actual-achievement-data storing unit 11, and acquires an ordering required-quantity from an ordering-required-quantity-data storing unit 23 to be discussed later. Next, the correction safety inventory quantity calculation section 310 calculates an error rate based on the acquired number of ordered parts and ordering required-quantity.

As shown in equation (1), this error rate becomes negative when the number of ordered parts is smaller than the market demand forecasting value. On the other hand, the error rate becomes positive when the number of ordered parts is larger than the market demand forecasting value.

Next, the correction safety inventory quantity calculation section 310 calculates a money-amount-zone index number using a money-amount-zone index number calculation equation. The money-amount-zone index number calculation equation is an equation which multiplies a total of market demand forecasting values in the determined supply period by the standard price of a service part.

The correction safety inventory quantity calculation section 310 calculates a correction safety inventory quantity using a correction safety inventory quantity calculation equation. The correction safety inventory quantity calculation equation is shown in FIG. 3 as equation (2). As shown in equation (2), the correction safety inventory quantity calculation section 310 calculates a correction safety inventory quantity using an error rate calculated from equation (1) and a calculated money-amount-zone index number.

Next, an explanation will be given of the reference safety inventory quantity calculation section 311.

The reference safety inventory quantity calculation section 311 calculates a reference safety inventory quantity. The reference safety inventory quantity is calculated based on a market demand forecasting value at a certain rate. The safety inventory calculation section 212 calculates the reference safety inventory quantity using a reference safety inventory quantity calculation equation. The reference safety inventory quantity calculation equation is shown in FIG. 3 as equation (3).

An order forecast quantity in equation (3) is a total of market demand forecasting values corresponding to a predetermined period (forecasting value total calculation period) from a present day at a forecasting-target office of a forecasting-target service part. In the embodiment, 60 days is set to the forecasting value total calculation period. Therefore, the order forecast quantity is a total of market demand forecasting values during 60 days from a present day.

Next, an explanation will be given of the determined safety inventory quantity calculation section 312.

The determined safety inventory quantity calculation section 312 calculates a determined safety inventory quantity which is a value acquired by adding a correction safety inventory quantity to a reference safety inventory quantity calculated based on a market demand forecasting value.

Next, the ordering required-quantity calculation section 213 will be explained.

The ordering required-quantity calculation section 213 calculates an ordering required-quantity. More specifically, the ordering required-quantity calculation section 213 calculates an ordering required-quantity by adding a market demand forecasting value calculated by the market-demand-forecasting-value calculation section 211 and a determined safety inventory quantity calculated by the safety inventory quantity calculation section 212.

A market demand forecasting result (ordering required-quantity) calculated by the ordering required-quantity calculation section 213 is stored in the ordering-required-quantity-data storing unit 23. The ordering required-quantity stored in the ordering-required-quantity-data storing unit 23 is used by the market-demand-forecasting-value calculation section 211 to calculate next market demand forecasting value.

Figure 2C:
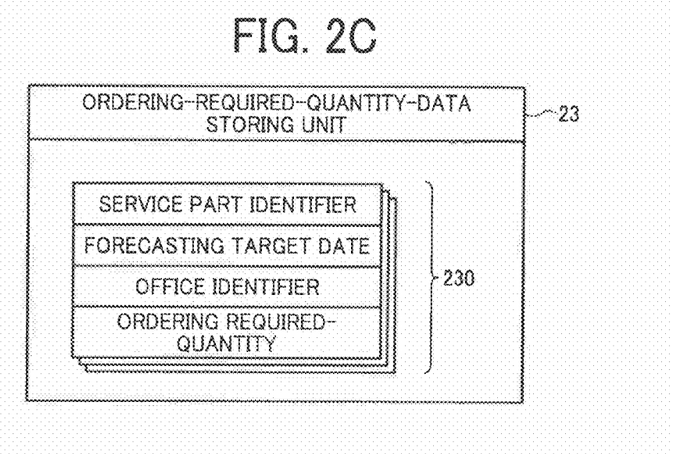
FIG. 2C is an explanatory diagram showing data stored in an ordering-required-quantity-data storing unit.

FIG. 2C shows ordering-required-quantity-data 230 stored as an ordering required-quantity in the ordering-required-quantity-data storing unit 23. The ordering-required-quantity-data 230 includes plural pieces of data on a service part identifier, a forecasting target date, an office identifier and an ordering required-quantity, and each data is stored in a corresponding data area.

A service part identifier data area stores data on an identifier to specify a service part subjected to forecasting.

A forecasting target date data area stores data on a date subjected to forecasting of an ordering required-quantity.

An office identifier data area stores data on an identifier to specify an office subjected to forecasting of an ordering required-quantity.

An ordering required-quantity data area stores an ordering required-quantity, which is necessary for an office specified by the office identifier at a forecasting target date, for each service part.

On the other hand, a market demand forecasting result (ordering required-quantity) calculated by the ordering required-quantity calculation section 213 is output to the result outputting section 214.

The result outputting section 214 supplies a market demand forecasting result (ordering required-quantity) calculated by the ordering required-quantity calculation section 213 to the manufacturing management system 30.

Furthermore, the ordering required-quantity calculation system 20 has the service-part-management-data storing unit 24 and the office management data storing unit 25.

The service-part-management-data storing unit 24 stores service part management data on a service part. When a service part to be supplied is newly decided, the service part management data is updated with new information on the new service part.

The service part management data includes plural pieces of data on a service part identifier, a service part name, a standard price, a determined supply period and determined-per-procurement-period index number, and each piece of data is stored in a corresponding data area.

A service part identifier data area stores data on an identifier to specify a service part.

A service part name data area stores data on the name of a service part.

A standard price data area stores data on the standard price of a service part.

A determined supply period data area stores data on a period from when a service part is ordered to when the service part is delivered (i.e., the supply lead time).

A determined-per-procurement-period index number data area stores data on an index set for each supply lead time of a service part. This index number becomes large as a determined supply period becomes long.

The office management data storing unit 25 stores office management data on an office which supplies a service part. The office management data is stored every time a new office is created. The office management data includes pieces of data on an office identifier and an error rate calculation target range, and each piece of data is stored in a corresponding data area.

An office identifier data area stores data on an identifier to specify an office.

An error rate calculation target range data area stores data on a parameter which specifies a number of months used for calculating an error rate of a market demand forecasting value at an office.

The ordering required-quantity calculation system 20 is connected to the manufacturing management system 30 via a network. As explained above, an ordering required-quantity calculated by the ordering required-quantity calculation system 20 is output to the manufacturing management system 30.

As the manufacturing management system 30 receives the ordering required-quantity calculated by the ordering required-quantity calculation system 20, the manufacturing management system 30 executes an instruction process for manufacturing a service part, a reserve process, or the like.

Next, an explanation will be given of the procedure of a calculation process of an ordering required-quantity of a service part executed by the inventory management system structured as explained above.

First, the control unit 21 calculates a market demand forecasting value based on an order entry actual achievement. Here, the market-demand-forecasting-value calculation section 211 acquires order-entry-actual-achievement data 110 from the order-entry-actual-achievement-data storing unit 11 of the order receiving system 10, and using a technology disclosed in, for example, Unexamined Japanese Patent Application KOKAI Publication No. 2007-141036, calculates a market demand forecasting value for each service part and for each office. In the embodiment, for example, market demand forecasting values over the next three months are calculated for each month.

More specifically, the market-demand-forecasting-value calculation section 211 of the control unit 21 forecasts a market demand according to the length of an order entry actual achievement period of a service part. When the order entry actual achievement period is long to some extent (e.g., greater than or equal to eighteen months), the market-demand-forecasting-value calculation section 211 calculates the accumulative transition of order quantities in the order entry actual achievement period, and calculates a tendency curve using a growth model.

Subsequently, the market-demand-forecasting-value calculation section 211 executes a periodical fluctuation determination process for determining whether or not there is a periodical fluctuation in the transition of the order quantity of a service part. When it is determined that there is no periodicity in the transition of the order quantity of the service part, the market-demand-forecasting-value calculation section 211 uses the tendency curve (tendency function) as a market demand forecasting model, and calculates a market demand forecasting value based on the tendency curve.

Conversely, when it is determined that there is a periodicity in the transition of the order quantity of the service part, the market-demand-forecasting-value calculation section 211 executes a periodical fluctuation applying process for forecasting a seasonal variation. More specifically, the market-demand-forecasting-value calculation section 211 multiplies a specified periodical fluctuation model by a calculated tendency curve (tendency function) to create a market demand forecasting curve, and calculates a market demand forecasting value based on the created market demand forecasting curve.

The market-demand-forecasting-value calculation section 211 breaks down the market demand forecasting value to a market demand forecasting value per operating day using the operating day calendar, and stores the broken-down market demand forecasting value in the market-demand-forecasting-value-data storing unit 22. In this case, the market-demand-forecasting-value calculation section 211 stores the calculated market demand forecasting value (number of ordered parts) in association with the service part identifier for specifying a forecasting-target service part, the office identifier for specifying the forecasting-target office, and the forecasting target date.

Next, the control unit 21 calculates a safety inventory quantity. Here, the safety inventory quantity calculation section 212 of the control unit 21 calculates a correction safety inventory quantity, a reference safe inventory quantity, and a determined safe inventory quantity. The calculation method of the safety inventory quantity will now be explained with reference to FIG. 3.

The correction safety inventory quantity calculation section 310 of the safety inventory quantity calculation section 212 executes the calculation process of an error rate (step S1-1). Specifically, the correction safety inventory quantity calculation section 310 acquires office management data including the office identifier for specifying a forecasting-target office from the office management data storing unit 25, and specifies the error rate calculation target range (period) of the office.

Subsequently, the correction safety inventory quantity calculation section 310 acquires most recent order-entry-actual-achievement data 110 according to the specified error rate calculation target range from the order-entry-actual-achievement-data storing unit 11, and acquires ordering-required-quantity-data 230 at the same period from the ordering-required-quantity-data storing unit 23. For example, when the error rate calculation target range is six month, order entry actual achievement data 110 and ordering-required-quantity-data 230 of past (recent) six month are acquired.

Subsequently, the correction safety inventory quantity calculation section 310 calculates an error rate. More specifically, first, the correction safety inventory quantity calculation section 310 calculates a total of numbers of ordered parts in the order-entry-actual-achievement data 110 in an error rate calculation target range. Further, the correction safety inventory quantity calculation section 310 sums up ordered required-quantities in the ordering-required-quantity-data 230, and calculates an ordering required-quantity in the error rate calculation target range.

Thereafter, the correction safety inventory quantity calculation section 310 substitute the calculated number of ordered parts and ordering required-quantity into equation (1). In this case, when the number of ordered parts is smaller than the ordering required-quantity, an error rate to be calculated becomes negative.

Next, the correction safety inventory quantity calculation section 310 executes the calculation process of a correction safety inventory quantity based on the calculated error rate (step S1-2). First, the correction safety inventory quantity calculation section 310 calculates a total of market demand forecasting values in a determined supply period. More specifically, the correction safety inventory quantity calculation section 310 refers to the service-part-management-data storing unit 24 using the identifier of a forecasting-target service part, and acquires a determined supply period corresponding to the service part identifier. Accordingly, the determined supply period for this service part is specified. Thereafter, the correction safety inventory quantity calculation section 310 calculates a market demand forecasting value in the specified determined supply period. In this case, the correction safety inventory quantity calculation section 310 acquires a market demand forecasting value for each day in the determined supply period from the market-demand-forecasting-value-data storing unit 22, and sums up the acquired market demand forecasting values.

Next, the correction safety inventory quantity calculation section 310 executes the calculation process of a moneyamount-zone index number using the money-amount-zone index number calculation equation. More specifically, the correction safety inventory quantity calculation section 310 acquires the standard price of the service part from the service-part-management-data storing unit 24, acquires a sum of the acquired standard price and the calculated market demand forecasting value in the determined supply period, substitutes it in the money-amount-zone index number calculation equation, thereby calculating a money-amount-zone index number.

Subsequently, the correction safety inventory quantity calculation section 310 calculates a correction safety inventory quantity using the correction safety inventory quantity calculation equation of (2). More specifically, the correction safety inventory quantity calculation section 310 substitutes the total of the calculated market demand forecasting values in the determined supply period, error rate, and money-amount-zone index number in the correction safety inventory quantity calculation equation, thereby calculating a correction safety inventory quantity. Here, when the substituted error rate is negative, the correction safety inventory quantity becomes negative, and if positive, the correction safety inventory quantity becomes positive.

Next, the reference safety inventory quantity calculation section 311 executes the calculation process of a reference safety inventory quantity (step S1-3). First, the reference safety inventory quantity calculation section 311 sums up market demand forecasting values from a present day to next sixty days. More specifically, the reference safety inventory quantity calculation section 311 acquires market demand forecasting value (order forecasted quantity) for each day from the present day to next sixty days from the market-demand-forecasting-value-data storing unit 22, and sums up those values. The reference safety inventory quantity calculation section 311 substitutes the calculated order forecasted quantity and a determined-per-procurement-period index number into the reference safety inventory quantity calculation equation of (3), thereby calculating a reference safety inventory quantity.

Next, the determined safety inventory quantity calculation section 312 executes the calculation process of a determined safety inventory quantity (step S1-4). More specifically, the safety inventory quantity calculation section 212 calculates a determined safety inventory quantity which is a quantity obtained by adding the calculated correction safety inventory quantity and the calculated reference safety inventory quantity. In this case, when the correction safety inventory quantity is positive, the determined safety inventory quantity becomes larger than the reference safety inventory quantity. When the correction safety inventory quantity is negative, the determined safety inventory quantity becomes smaller than the reference safety inventory quantity.

Through the foregoing routines, the calculation process of the safety inventory quantity is completed.

When the safety inventory quantity is calculated, the ordering required-quantity calculation section 213 of the control unit 21 shown in FIG. 1 calculates an ordering required-quantity. More specifically, the ordering required-quantity calculation section 213 adds a market demand forecasting value calculated by the market-demand-forecasting-value calculation section 211 and a determined safety inventory quantity calculated by the safety inventory quantity calculation section 212 to calculate an ordering required-quantity.

Subsequently, the ordering required-quantity calculation section 213 stores the calculated ordering required-quantity as ordering-required-quantity-data 230 in the ordering-required-quantity-data storing unit 23 in association with the service part identifier of the service part, the office identifier, and the forecast target date.

Next, the control unit 21 outputs the ordering required-quantity. More specifically, the result outputting section 214 of the control unit 21 supplies the ordering-required-quantity-data 230 stored in the ordering-required-quantity-data storing unit 23 to the manufacturing management system 30.

Accordingly, the process by the ordering required-quantity calculation system 20 is completed.

According to the embodiment, the following effects can be achieved.

In the embodiment, the correction safety inventory quantity calculation section 310 substitutes the calculated number of ordered parts and ordering required-quantity into the equation of (1) to calculate the error rate, and calculates the correction safety inventory quantity using the error rate. When the number of ordered parts is smaller than the ordering required-quantity, the error rate becomes negative, and the correction safety inventory quantity becomes negative. Conversely, when the number of ordered parts is larger than the ordering required-quantity, the error rate becomes positive, and the correction safety inventory quantity becomes also positive.

The determined safety inventory quantity calculation section 312 calculates the determined safety inventory quantity which is a value obtained by adding the calculated correction safety inventory quantity and the calculated reference safety inventory quantity. In this case, when the correction safety inventory quantity is positive, the determined safety inventory quantity becomes larger than the reference safety inventory quantity, and when the correction safety inventory quantity is negative, the determined safety inventory quantity becomes smaller than the reference safety inventory quantity.

Accordingly, when, for example, an order entry actual achievement is larger than a market demand forecasting value and there is no sufficient extra stock part, the safety inventory quantity is then increased, and it is possible to avoid any stock out due to an unexpected market demand fluctuation. Moreover, when the order entry actual achievement is smaller than the market demand forecasting value and there are extra stock parts, the safety inventory quantity is then reduced, and it is possible to avoid stocking a large amount of excessive parts.

As explained above, according to the embodiment, the safety inventory quantity is increased or decreased in accordance with a market demand forecasting value and an order entry actual achievement, so that it is possible to maintain an appropriate inventory quantity.

Moreover, according to the embodiment, the correction safety inventory quantity calculation section 310 acquires office management data of a forecasting-target office and specifies the error rate calculation target range of the office. The correction safety inventory quantity calculation section 310 acquires most recent order-entry-actual-achievement data 110 according to the specified error rate calculation target range and ordering-required-quantity-data 230 at the same period, and executes the calculation process of the error rate using those pieces of data. Therefore, it is possible to calculate the error rate suitable for the circumstance of each office. Further, because the error rate is calculated based on a recent (sixty days) order entry actual achievement, when, for example, a market demand forecasting value is larger than an ordering required-quantity, the safety inventory quantity of service parts highly possibly remained as stocks can be promptly reduced, thereby suppressing any overstocked inventory.

Furthermore, because the error rate is calculated based on recent (sixty days) order entry actual achievement, when there is a periodical fluctuation or the like in a market demand forecasting curve, the error rate can be reset in accordance with the periodical fluctuation or the like. This results in maintaining an appropriate inventory quantity.

Although the forecasting value total calculation period is set to sixty days in the embodiment, this period is optional, and can be changed service part by service part.

In the embodiment, the correction safety inventory quantity calculation section 310 substitutes the calculated total of market demand forecasting values in a determined supply period, error rate, and money-amount-zone index based on the unit price of a service part into the correction safety inventory quantity calculation equation to calculate a correction safety inventory quantity. Because the correction safety inventory quantity is calculated based on the unit price of a service part in this fashion, the correction safety inventory quantity is decided in consideration of the cost of the part. This makes it possible to do inventory management in accordance with costs.

In the embodiment, the reference safety inventory quantity calculation section 311 calculates a reference safety inventory quantity based on an order forecasted quantity and a determined-per-procurement-period index number. Accordingly, the reference safety inventory quantity can be adjusted based on the determined supply period, so that it is possible to rapidly cope with a fluctuation in an order quantity due to unexpected reasons. Moreover, because the reference safety inventory quantity can be adjusted based on the determined supply period, a determined safety inventory quantity of a service part which has a short determined supply period can be reduced to maintain an appropriate safety inventory quantity.

According to the embodiment, the market-demand-forecasting-value calculation section 211 calculates a market demand forecasting value based on an order entry actual achievement for each office and for each service part. Therefore, a safety inventory quantity can be calculated for each office and for each service part.

The inventory management system of the foregoing embodiment can be modified as follows.

In the foregoing embodiment, an error rate is calculated by subtracting an ordering required-quantity from a number of ordered parts, and by dividing the difference value by the ordering required-quantity. However, instead of this calculation, a deviation from an forecasting value (=(number of ordered parts−ordering required-quantity)/ordering required-quantity) is acquired for each month, and a total of deviations from forecasting values in plural months corresponding to an error rate calculation target range can be used as an error rate.

In the foregoing embodiment, the correction safety inventory quantity calculation section 310 calculates a correction safety inventory quantity using the equation (2). However, the calculation equation of the correction safety inventory quantity is not limited to this equation. Various calculation equations can be adopted if the correction safety inventory quantity becomes negative when a number of ordered parts is larger than an ordering required-quantity.

According to the embodiment, the correction safety inventory quantity calculation section 310 calculates a money-amount-zone index number based on a total of market demand forecasting values in a determined supply period and a standard price. However, the calculation method of the money-amount-zone index number is also not limited to this method. For example, if it is desirable to obtain a money-amount-zone index number which relates to the amount of money of a product, an amount of money relating to a manufacturing cost of a product and a stocking cost is used instead of the standard price to calculate a money-amount-zone index number.

In the foregoing embodiment, the reference safety inventory quantity calculation section 311 calculates a reference safety inventory quantity using the equation (3). However, the calculation equation of the reference safety inventory quantity is not limited to this equation, and various calculation equations conventionally used can be adopted.

Note that the control unit 21 may be comprised of a general-purpose computer. In this case, the process program executed by the control unit 21 may be distributed with such a program being stored in a computer-readable recording medium, such as a CD-ROM (Compact Disc Read Only Memory), a DVD (Digital Versatile Disc), an MO (Magneto Optical disc), or a flexible disk, and may be installed in the control unit 21. Moreover, the process program stored in a server device over a communication network like the Internet may be downloaded and installed in the computer.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-321160 filed on Dec. 12, 2007 and including specification, claims, drawings and summary. The disclosure of the above Japanese Patent Application is incorporated herein by reference in its entirety.

What is claimed is:

1. An inventory management system implemented by an information processing apparatus, the system comprising:
an ordering-required-quantity-data storing unit that stores an ordering required-quantity of a product previously forecast, the ordering required-quantity incorporating a market demand forecasting value and a safety inventory quantity;
an order-entry-actual-achievement-data storing unit that stores an actual order quantity of a product for which order entries have been placed;
a market-demand-forecasting-value calculation unit that calculates a market demand forecasting value based on the actual order quantity stored in the order-entry-actual-achievement-data storing unit;
a correction quantity calculation unit that acquires the actual order quantity from the order-entry-actual-achievement-data storing unit, acquires the ordering required-quantity from the ordering-required-quantity-data storing unit, and calculates a correction quantity for a safety inventory quantity of the product based on an error rate, wherein the error rate indicates an error of the actual order quantity to the ordering required-quantity thereof and becomes negative when the ordering required-quantity is larger than the actual order quantity, and positive when the ordering required-quantity is smaller than the actual order quantity;
a reference safety inventory quantity calculation unit that calculates a reference safety inventory quantity based on market demand forecasting of the product;
a determined safety inventory quantity calculation unit that calculates a determined safety inventory quantity, which is a value obtained by adding the correction quantity calculated by the correction quantity calculation unit to the reference safety inventory quantity calculated by the reference safety inventory quantity calculation unit; and an ordering required-quantity calculation unit that calculates the market demand forecasting value, which is a value obtained by adding the determined safety inventory quantity calculated by the determined safety inventory quantity calculation unit to the market demand forecasting value calculated by the market-demand-forecasting-value calculation unit, wherein the correction quantity calculation unit calculates
the error rate for each office which supplies the product based on an error in the actual order quantity of the product to a past ordering required-quantity thereof in a predetermined period, the correction quantity based on the error rate and a market demand forecasting value in a supply lead time of the product, and the correction quantity based on a unit price of the product.

2. An inventory management system implemented by an information processing apparatus, the system comprising:

an ordering-required-quantity-data storing unit that stores an ordering-required-quantity of a product previously forecast, the ordering required-quantity incorporating a market demand forecasting value and a safety inventory quantity;

an order-entry-actual-achievement-data storing unit that stores an actual order quantity of a product for which order entries have been placed;

a market-demand-forecasting-value calculation unit that calculates a market demand forecasting value based on the actual order quantity stored in the order-entry-actual-achievement-data storing unit;

a correction quantity calculation unit that acquires the actual order quantity from the order-entry-actual-achievement-data storing unit, acquires the ordering required-quantity from the ordering-required-quantity-data storing unit, and calculates a correction quantity for a safety inventory quantity of the product based on an error rate, wherein the error rate indicates an error of the actual order quantity to the ordering required-quantity thereof and becomes negative when the ordering required-quantity is larger than the actual order quantity, and positive when the ordering required-quantity is smaller than the actual order quantity;

a reference safety inventory quantity calculation unit that calculates a reference safety inventory quantity based on market demand forecasting of the product;

a determined safety inventory quantity calculation unit that calculates a determined safety inventory quantity, which is a value obtained by adding the correction quantity calculated by the correction quantity calculation unit to the reference safety inventory quantity calculated by the reference safety inventory quantity calculation unit; and an ordering required-quantity calculation unit that calculates the market demand forecasting value, which is a value obtained by adding the determined safety inventory quantity calculated by the determined safety inventory quantity calculation unit to the market demand forecasting value calculated by the market-demand-forecasting-value calculation unit, wherein the reference safety inventory quantity calculation unit calculates the reference safety inventory quantity based on a market demand forecasting value of the product and an index number set for each supply lead time of the product.

3. An inventory management system implemented by an information processing apparatus, the system comprising:

an ordering-required-quantity-data storing unit that stores an ordering-required-quantity of a product previously forecast, the ordering required-quantity incorporating a market demand forecasting value and a safety inventory quantity;

an order-entry-actual-achievement-data storing unit that stores an actual order quantity of a product for which order entries have been placed;

a market-demand-forecasting-value calculation unit that calculates a market demand forecasting value based on the actual order quantity stored in the order-entry-actual-achievement-data storing unit;

a correction quantity calculation unit that acquires the actual order quantity from the order-entry-actual-achievement-data storing unit, acquires the ordering required-quantity from the ordering-required-quantity-data storing unit, and calculates a correction quantity for a safety inventory quantity of the product based on an error rate, wherein the error rate indicates an error of the actual order quantity to the ordering required-quantity thereof and becomes negative when the ordering required-quantity is larger than the actual order quantity, and positive when the ordering required-quantity is smaller than the actual order quantity;

a reference safety inventory quantity calculation unit that calculates a reference safety inventory quantity based on market demand forecasting of the product;

a determined safety inventory quantity calculation unit that calculates a determined safety inventory quantity, which is a value obtained by adding the correction quantity calculated by the correction quantity calculation unit to the reference safety inventory quantity calculated by the reference safety inventory quantity calculation unit; and an ordering required-quantity calculation unit that calculates the market demand forecasting value, which is a value obtained by adding the determined safety inventory quantity calculated by the determined safety inventory quantity calculation unit to the market demand forecasting value calculated by the market-demand-forecasting-value calculation unit, wherein the market-demand-forecasting-value calculation unit that calculates the market demand forecasting value based on an order entry actual achievement, product by product and office by office which supplies the product.

4. An inventory management method implemented by an information processing apparatus comprising:

a first storing step of storing, in an ordering-required-quantity-data storing device, an ordering required-quantity of a product previously forecast, the ordering required-quantity incorporating a market demand forecasting value and a safety inventory quantity;

a second storing step of storing, in an order-entry-actual-achievement-data storing device, an actual order quantity of a product for which order entries have been placed;

a market-demand-forecasting-value calculation step of calculating, by using a market-demand-forecasting-value calculation device, a market demand forecasting value based on the actual order quantity stored in the order-entry-actual-achievement-data storing device;

a correction quantity calculation step of acquiring, by using a correction quantity calculation device, the actual order quantity stored in the order-entry-actual-achievement-data storing device, acquiring the ordering required-quantity stored in the ordering-required-quantity-data storing device, and calculating based on an error rate, wherein the error rate indicates an error in the actual order quantity to the ordering required-quantity thereof and becomes negative when the ordering required-quantity is larger than the actual order quantity and positive when the ordering required-quantity is smaller than the actual order quantity, a correction quantity for a safety inventory quantity of the product;

a reference safety inventory quantity calculation step of calculating, by using a reference safety inventory quantity calculation device, a reference safety inventory quantity based on market demand forecasting of the product;

a determined safety inventory calculation step of calculating, by using a determined safety inventory quantity calculation device, a determined safety inventory quantity, which is a value obtained by adding the correction quantity calculated in the correction quantity calculation step to the reference safety inventory quantity calculated in the reference safety inventory quantity calculation step; and an ordering required-quantity calculation step of calculating, by using an ordering required-quantity calculation device, the market demand forecasting value, which is a value obtained by adding the determined safety inventory quantity calculated in the determined safety inventory quantity calculation step to the market demand forecasting value calculated in the market-demand-forecasting-value calculation step, wherein the correction quantity calculation step further includes calculating the error rate for each office which supplies the product based on an error in the actual order quantity of the product to a past ordering required-quantity thereof in a predetermined period, the correction quantity based on the error rate and a market demand forecasting value in a supply lead time of the product, and the correction quantity based on a unit price of the product.

5. A non-transitory computer-readable medium storing computer readable instructions thereon that when executed by an information processing apparatus cause the information processing apparatus to perform a method comprising:

an ordering-required-quantity-data storing step of storing an ordering required-quantity of a product previously forecast, the ordering required-quantity incorporating a market demand forecasting value and a safety inventory quantity;

an order-entry-actual-achievement-data storing step of storing an actual order quantity of a product for which order entries have been placed;

a market-demand-forecasting-value calculation step of calculating a market demand forecasting value based on the actual order quantity stored in the order-entry-actual-achievement-data storing step;

a correction quantity calculation step of acquiring the actual order quantity calculated in the order-entry-actual-achievement-data storing step, acquiring the ordering required-quantity stored in the ordering-required-quantity-data storing step, and calculating based on an error rate, wherein the error rate indicates an error in the actual order quantity to the ordering required-quantity thereof and becomes negative when the ordering required-quantity is larger than the actual order quantity and positive when the ordering required-quantity is smaller than the actual order quantity, a correction quantity for a safety inventory quantity of the product;

a reference safety inventory quantity calculation step of calculating a reference safety inventory quantity based on market demand forecasting of the product;

a determined safety inventory quantity calculation step of calculating a determined safety inventory quantity, which is a value obtained by adding the correction quantity calculated in the correction quantity calculation step to the reference safety inventory quantity calculated in the reference safety inventory quantity calculation step; and an ordering required-quantity calculation step of calculating the market demand forecasting value, which is a value obtained by adding the determined safety inventory quantity calculated in the determined safety inventory quantity calculation step to the market demand forecasting value calculated in the market-demand-forecasting-value calculation step, wherein the correction quantity calculation step further includes calculating the error rate for each office which supplies the product based on an error in the actual order quantity of the product to a past ordering required-quantity thereof in a predetermined period, the correction quantity based on the error rate and a market demand forecasting value in a supply lead time of the product, and the correction quantity based on a unit price of the product.

6. An inventory management method implemented by an information processing apparatus comprising:

a first storing step of storing, in an ordering-required-quantity-data storing device, an ordering required-quantity of a product previously forecast, the ordering required-quantity incorporating a market demand forecasting value and a safety inventory quantity;

a second storing step of storing, in an order-entry-actual-achievement-data storing device, an actual order quantity of a product for which order entries have been placed;

a market-demand-forecasting-value calculation step of calculating, by using a market-demand-forecasting-value calculation device, a market demand forecasting value based on the actual order quantity stored in the order-entry-actual-achievement-data storing device;

a correction quantity calculation step of acquiring, by using a correction quantity calculation device, the actual order quantity stored in the order-entry-actual-achievement-data storing device, acquiring the ordering required-quantity stored in the ordering-required-quantity-data storing device, and calculating based on an error rate, wherein the error rate indicates an error in the actual order quantity to the ordering required-quantity thereof and becomes negative when the ordering required-quantity is larger than the actual order quantity and positive when the ordering required-quantity is smaller than the actual order quantity, a correction quantity for a safety inventory quantity of the product;

a reference safety inventory quantity calculation step of calculating, by using a reference safety inventory quantity calculation device, a reference safety inventory quantity based on market demand forecasting of the product;

a determined safety inventory calculation step of calculating, by using a determined safety inventory quantity calculation device, a determined safety inventory quantity, which is a value obtained by adding the correction quantity calculated in the correction quantity calculation step to the reference safety inventory quantity calculated in the reference safety inventory quantity calculation step; and an ordering required-quantity calculation step of calculating, by using an ordering required-quantity calculation device, the market demand forecasting value, which is a value obtained by adding the determined safety inventory quantity calculated in the determined safety inventory quantity calculation step to the market demand forecasting value calculated in the market-demand-forecasting-value calculation step, wherein the reference safety inventory quantity calculation step further includes calculating the reference safety inventory quantity based on a market demand forecasting value of the product and an index number set for each supply lead time of the product.

7. An inventory management method implemented by an information processing apparatus comprising:

a first storing step of storing, in an ordering-required-quantity-data storing device, an ordering required-quantity of a product previously forecast, the ordering required-quantity incorporating a market demand forecasting value and a safety inventory quantity;

a second storing step of storing, in an order-entry-actual-achievement-data storing device, an actual order quantity of a product for which order entries have been placed;

a market-demand-forecasting-value calculation step of calculating, by using a market-demand-forecasting-value calculation device, a market demand forecasting value based on the actual order quantity stored in the order-entry-actual-achievement-data storing device;

a correction quantity calculation step of acquiring, by using a correction quantity calculation device, the actual order quantity stored in the order-entry-actual-achievement-data storing device, acquiring the ordering required-quantity stored in the ordering-required-quantity-data storing device, and calculating based on an error rate, wherein the error rate indicates an error in the actual order quantity to the ordering required-quantity thereof and becomes negative when the ordering required-quantity is larger than the actual order quantity and positive when the ordering required-quantity is smaller than the actual order quantity, a correction quantity for a safety inventory quantity of the product;

a reference safety inventory quantity calculation step of calculating, by using a reference safety inventory quantity calculation device, a reference safety inventory quantity based on market demand forecasting of the product;

a determined safety inventory calculation step of calculating, by using a determined safety inventory quantity calculation device, a determined safety inventory quantity, which is a value obtained by adding the correction quantity calculated in the correction quantity calculation step to the reference safety inventory quantity calculated in the reference safety inventory quantity calculation step; and an ordering required-quantity calculation step of calculating, by using an ordering required-quantity calculation device, the market demand forecasting value, which is a value obtained by adding the determined safety inventory quantity calculated in the determined safety inventory quantity calculation step to the market demand forecasting value calculated in the market-demand-forecasting-value calculation step, wherein the market-demand-forecasting-value calculation step further includes calculating the market demand forecasting value based on an order entry actual achievement, product by product and office by office which supplies the product.

8. A non-transitory computer-readable medium storing a computer readable instructions thereon that when executed by an information processing apparatus cause the information processing apparatus to perform a method comprising:

an ordering-required-quantity-data storing step of storing an ordering required-quantity of a product previously forecast, the ordering required-quantity incorporating a market demand forecasting value and a safety inventory quantity;

an order-entry-actual-achievement-data storing step of storing an actual order quantity of a product for which order entries have been placed;

a market-demand-forecasting-value calculation step of calculating a market demand forecasting value based on the actual order quantity stored in the order-entry-actual-achievement-data storing step;

a correction quantity calculation step of acquiring the actual order quantity calculated in the order-entry-actual-achievement-data storing step, acquiring the ordering required-quantity stored in the ordering-required-quantity-data storing step, and calculating based on an error rate, wherein the error rate indicates an error in the actual order quantity to the ordering required-quantity thereof and becomes negative when the ordering required-quantity is larger than the actual order quantity and positive when the ordering required-quantity is smaller than the actual order quantity, a correction quantity for a safety inventory quantity of the product;

a reference safety inventory quantity calculation step of calculating a reference safety inventory quantity based on market demand forecasting of the product;

a determined safety inventory quantity calculation step of calculating a determined safety inventory quantity, which is a value obtained by adding the correction quantity calculated in the correction quantity calculation step to the reference safety inventory quantity calculated in the reference safety inventory quantity calculation step; and an ordering required-quantity calculation step of calculating the market demand forecasting value, which is a value obtained by adding the determined safety inventory quantity calculated in the determined safety inventory quantity calculation step to the market demand forecasting value calculated in the market-demand-forecasting-value calculation step, wherein the reference safety inventory quantity calculation step further includes calculating the reference safety inventory quantity based on a market demand forecasting value of the product and an index number set for each supply lead time of the product.

9. A non-transitory computer-readable medium storing a computer readable instructions thereon that when executed by an information processing apparatus cause the information processing apparatus to perform a method comprising:

an ordering-required-quantity-data storing step of storing an ordering required-quantity of a product previously forecast, the ordering required-quantity incorporating a market demand forecasting value and a safety inventory quantity;

an order-entry-actual-achievement-data storing step of storing an actual order quantity of a product for which order entries have been placed;

a market-demand-forecasting-value calculation step of calculating a market demand forecasting value based on the actual order quantity stored in the order-entry-actual-achievement-data storing step;

a correction quantity calculation step of acquiring the actual order quantity calculated in the order-entry-actual-achievement-data storing step, acquiring the ordering required-quantity stored in the ordering-required-quantity-data storing step, and calculating based on an error rate, wherein the error rate indicates an error in the actual order quantity to the ordering required-quantity thereof and becomes negative when the ordering required-quantity is larger than the actual order quantity and positive when the ordering required-quantity is smaller than the actual order quantity, a correction quantity for a safety inventory quantity of the product;

a reference safety inventory quantity calculation step of calculating a reference safety inventory quantity based on market demand forecasting of the product;

a determined safety inventory quantity calculation step of calculating a determined safety inventory quantity, which is a value obtained by adding the correction quantity calculated in the correction quantity calculation step to the reference safety inventory quantity calculated in the reference safety inventory quantity calculation step; and an ordering required-quantity calculation step of calculating the market demand forecasting value, which is a value obtained by adding the determined safety inventory quantity calculated in the determined safety inventory quantity calculation step to the market demand forecasting value calculated in the market-demand-forecasting-value calculation step, wherein the market-demand-forecasting-value calculation step further includes calculating the market demand forecasting value based on an order entry actual achievement, product by product and office by office which supplies the product.

\* \* \* \* \*